US012682667B2

(12) United States Patent

Tsubusaki

(10) Patent No.: US 12,682,667 B2
(45) Date of Patent: Jul. 14, 2026

(54) IMAGE PROCESSING APPARATUS, IMAGE PROCESSING METHOD, MICROSCOPE SYSTEM, AND STORAGE MEDIUM

(71) Applicant: CANON KABUSHIKI KAISHA, Tokyo (JP)

(72) Inventor: Akihiro Tsubusaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/884,391

(22) Filed: Sep. 13, 2024

(65) Prior Publication Data

US 2025/0005943 A1     Jan. 2, 2025

Related U.S. Application Data

(63) Continuation of application No. PCT/JP2022/048567, filed on Dec. 28, 2022.

(30) Foreign Application Priority Data

Mar. 31, 2022     (JP) ................................. 2022-060796

(51) Int. Cl.
*G06V 20/69*          (2022.01)
*G02B 21/24*          (2006.01)
(Continued)

(52) U.S. Cl.
CPC ......... *G06V 20/695* (2022.01); *G02B 21/244* (2013.01); *G02B 21/365* (2013.01); (Continued)

(58) Field of Classification Search
CPC .... G02B 21/244; G02B 21/365; G02B 21/26; G02B 21/36; G06V 10/25; G06V 10/56; (Continued)

(56) References Cited

U.S. PATENT DOCUMENTS

2019/0369000 A1* 12/2019 Lu .......................... G06T 7/0012
2020/0073109 A1*  3/2020 Futami ................... H04N 23/45
2024/0120073 A1*  4/2024 Sugie ........................ G06F 3/14

FOREIGN PATENT DOCUMENTS

JP          2010282229 A     12/2010
JP          2013238459 A  *  11/2013
(Continued)

OTHER PUBLICATIONS

Foreign Patent Documents #2, 3, 5 and 7 were cited in the International Search Report dated Mar. 20, 2023, of International Application No. PCT/JP2022/048567, without an English translation.

*Primary Examiner* — William C Vaughn, Jr.
*Assistant Examiner* — Astewaye Gettu Zewede
(74) *Attorney, Agent, or Firm* — Cowan, Liebowitz & Latman, P.C.

(57)          ABSTRACT

An image processing apparatus obtains image data captured via a microscope, obtains first color information from the image data and detects a region corresponding to an observation target from the image data. The first color information is information relating to saturation, and the image processing apparatus detects a region with a value for saturation based on the first color information that is greater than a predetermined threshold as the region corresponding to the observation target of the image data.

14 Claims, 11 Drawing Sheets

(51) Int. Cl.

| | |
|---|---|
| *G02B 21/36* | (2006.01) |
| *G06V 10/25* | (2022.01) |
| *G06V 10/56* | (2022.01) |

(52) U.S. Cl.
CPC .............. *G06V 10/25* (2022.01); *G06V 10/56* (2022.01); *G06V 20/693* (2022.01); *G06V 2201/07* (2022.01)

(58) Field of Classification Search
CPC .............. G06V 20/693; G06V 20/695; G06V 2201/07; D06F 37/304; D06F 58/08; G01N 21/27
USPC ........................................................ 348/79
See application file for complete search history.

(56) References Cited

FOREIGN PATENT DOCUMENTS

| | | | | |
|---|---|---|---|---|
| JP | 2015181374 | A | * 10/2015 | |
| JP | 2016051167 | A | 4/2016 | |
| JP | 2017207651 | A | * 11/2017 | ............ H04N 23/12 |
| JP | 2020501111 | A | 1/2020 | |
| WO | 2018067770 | A1 | 4/2018 | |

* cited by examiner

F I G. 3
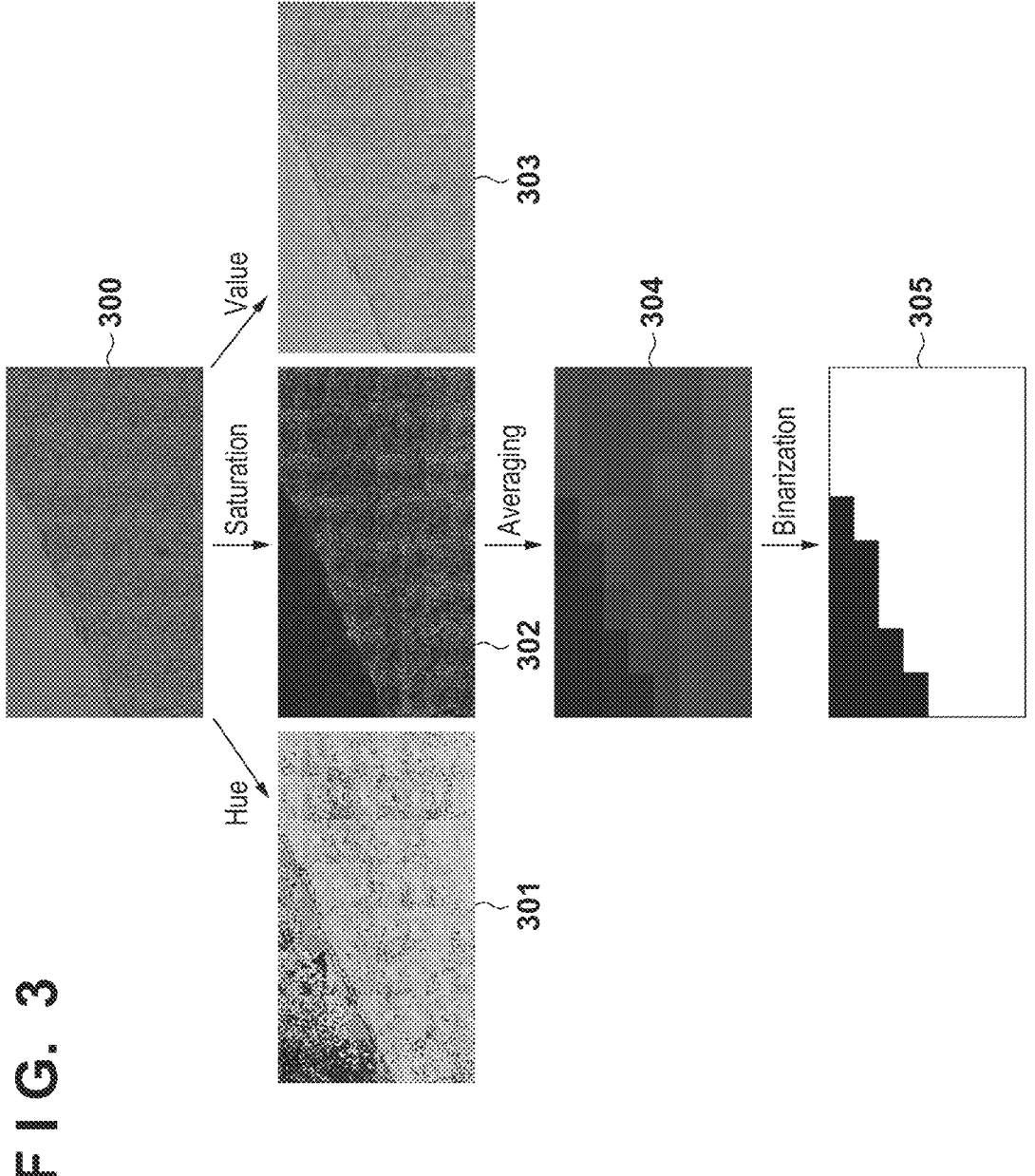

F I G. 5A
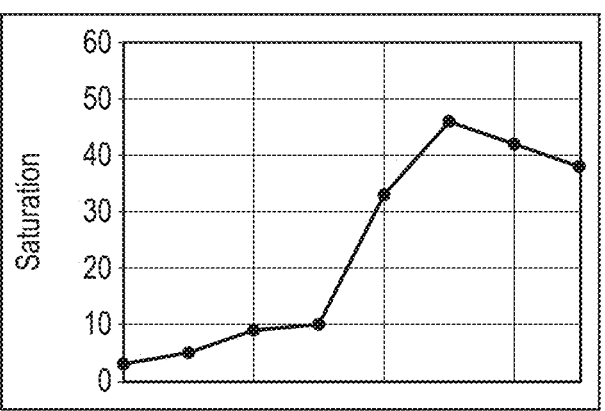
F I G. 5B
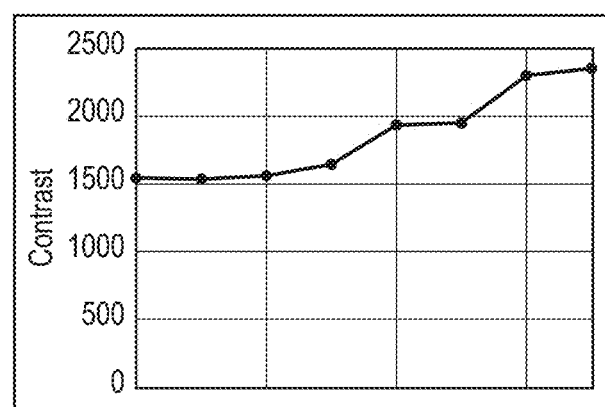
F I G. 5C
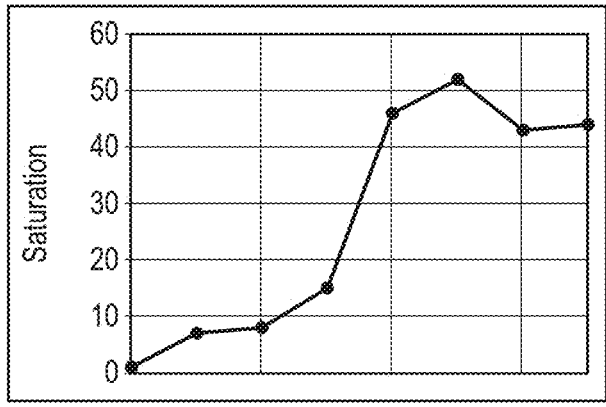
F I G. 5D
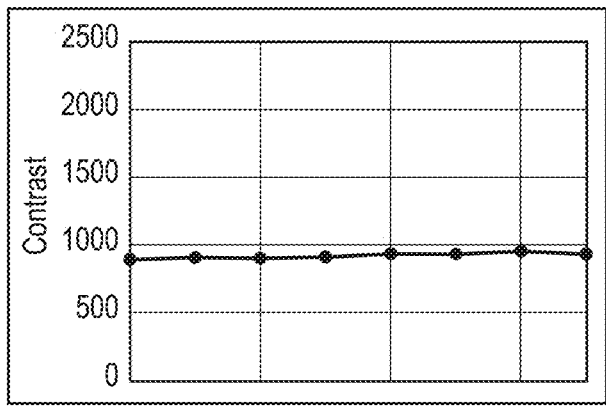

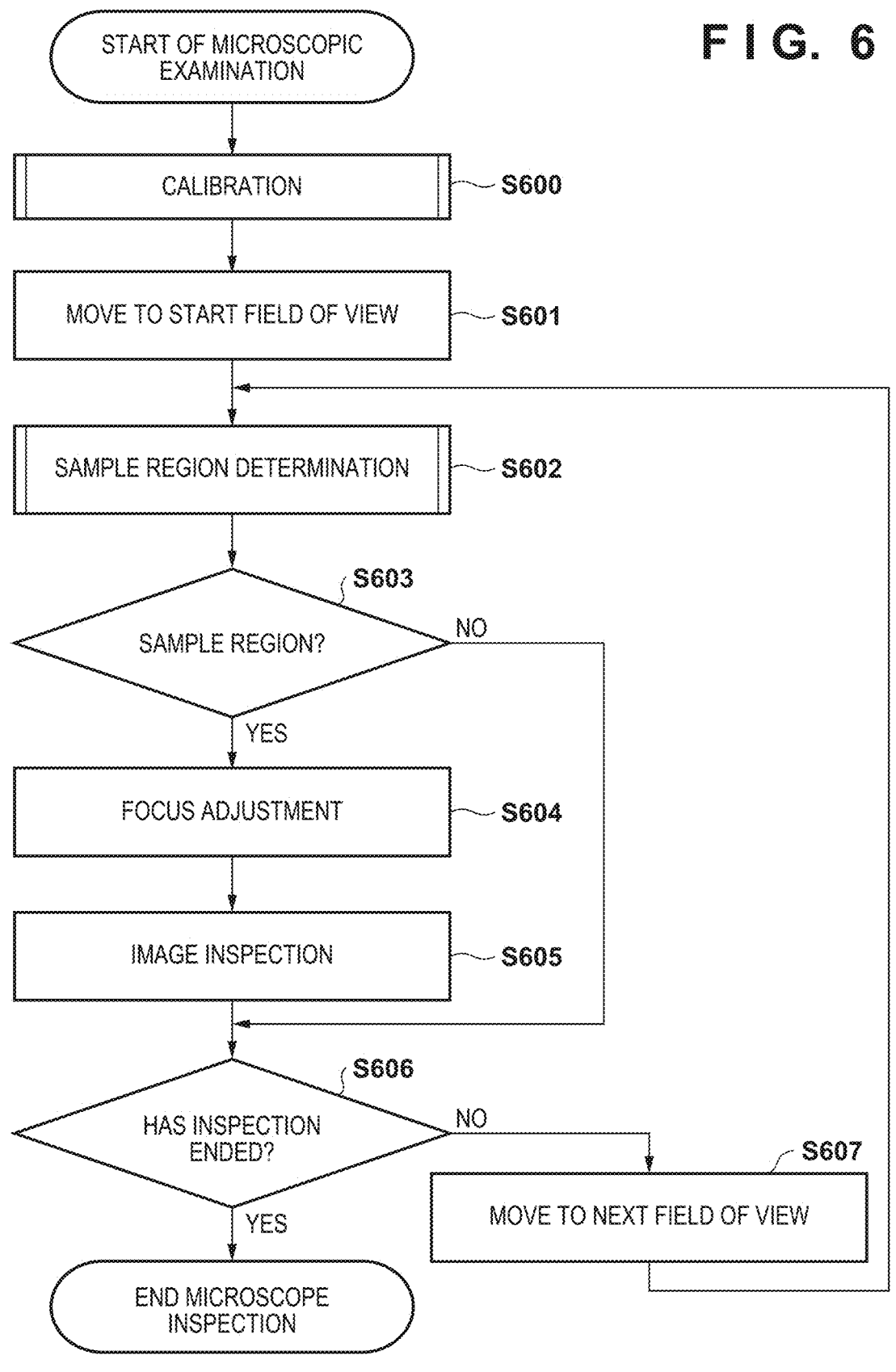
F I G. 6

F I G. 7
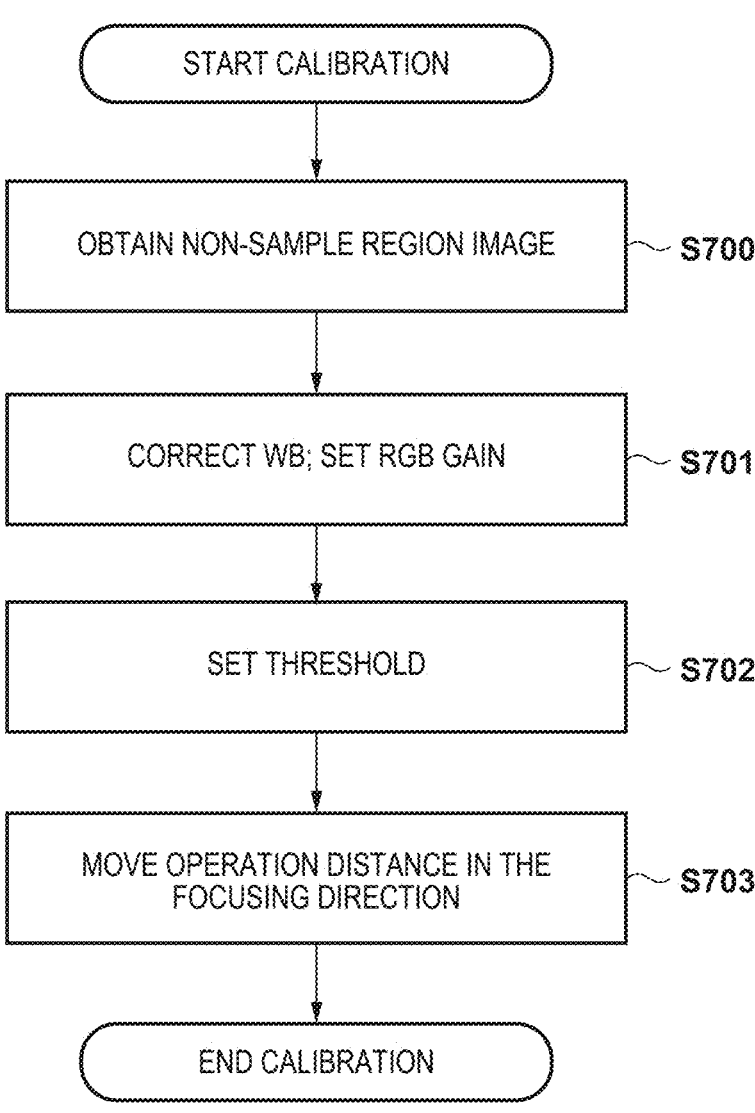

F I G. 8

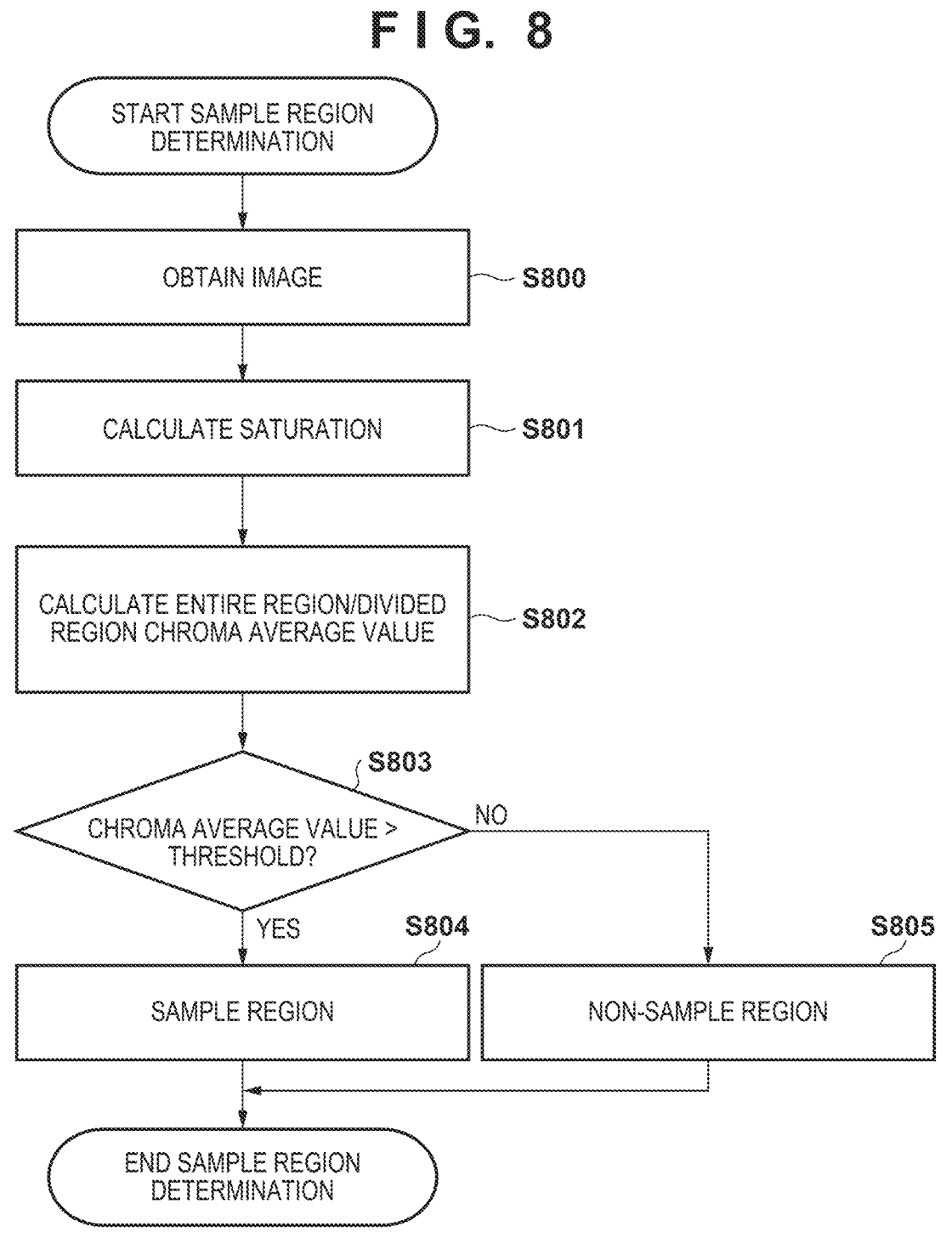

```
        ┌─────────────────────────────┐
        │   START SAMPLE REGION       │
        │      DETERMINATION          │
        └─────────────────────────────┘
                      │
                      ▼
        ┌─────────────────────────────┐
        │      OBTAIN IMAGE           │──── S800
        └─────────────────────────────┘
                      │
                      ▼
        ┌─────────────────────────────┐
        │   CALCULATE SATURATION      │──── S801
        └─────────────────────────────┘
                      │
                      ▼
        ┌─────────────────────────────┐
        │ CALCULATE ENTIRE REGION/    │──── S802
        │ DIVIDED REGION CHROMA       │
        │ AVERAGE VALUE               │
        └─────────────────────────────┘
                      │
                      ▼
                   S803
            ╱─────────────────╲        NO
           ╱ CHROMA AVERAGE    ╲──────────────┐
           ╲ VALUE > THRESHOLD?╱               │
            ╲─────────────────╱                │
                   │ YES                        │
              S804 │                      S805  │
              ▼                            ▼
        ┌──────────────────┐      ┌──────────────────────┐
        │  SAMPLE REGION   │      │  NON-SAMPLE REGION   │
        └──────────────────┘      └──────────────────────┘
                  │                         │
                  │◄────────────────────────┘
                  ▼
        ┌─────────────────────────────┐
        │   END SAMPLE REGION         │
        │      DETERMINATION          │
        └─────────────────────────────┘
```

F I G. 9A
F I G. 9B
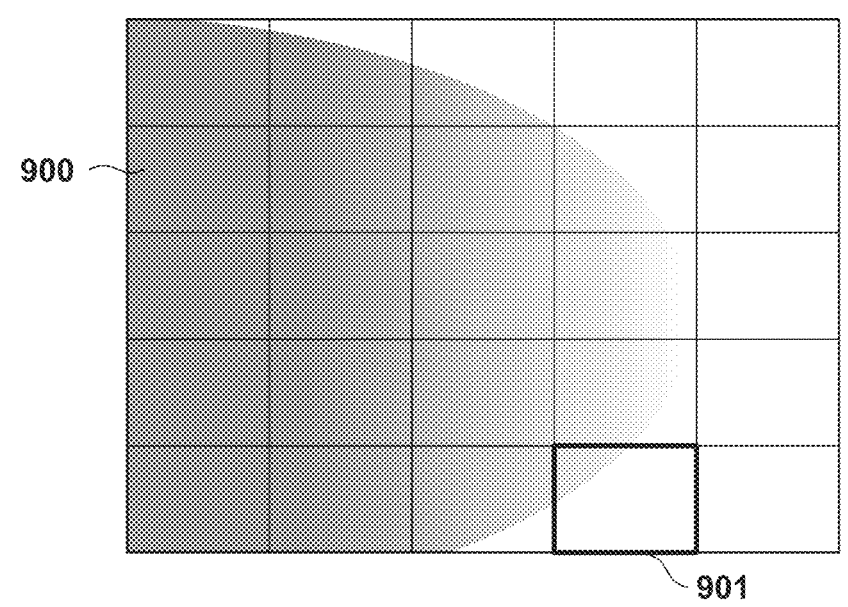
F I G. 9C
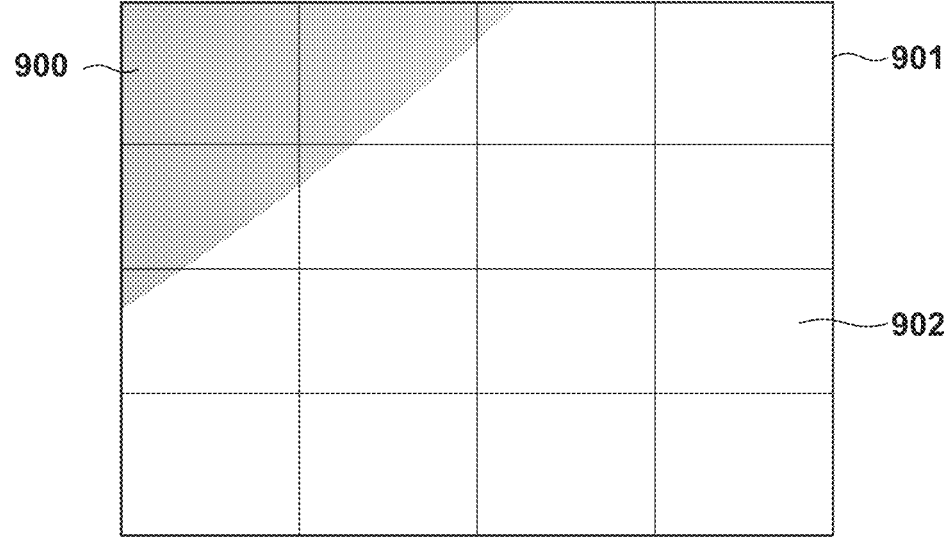

F I G. 10
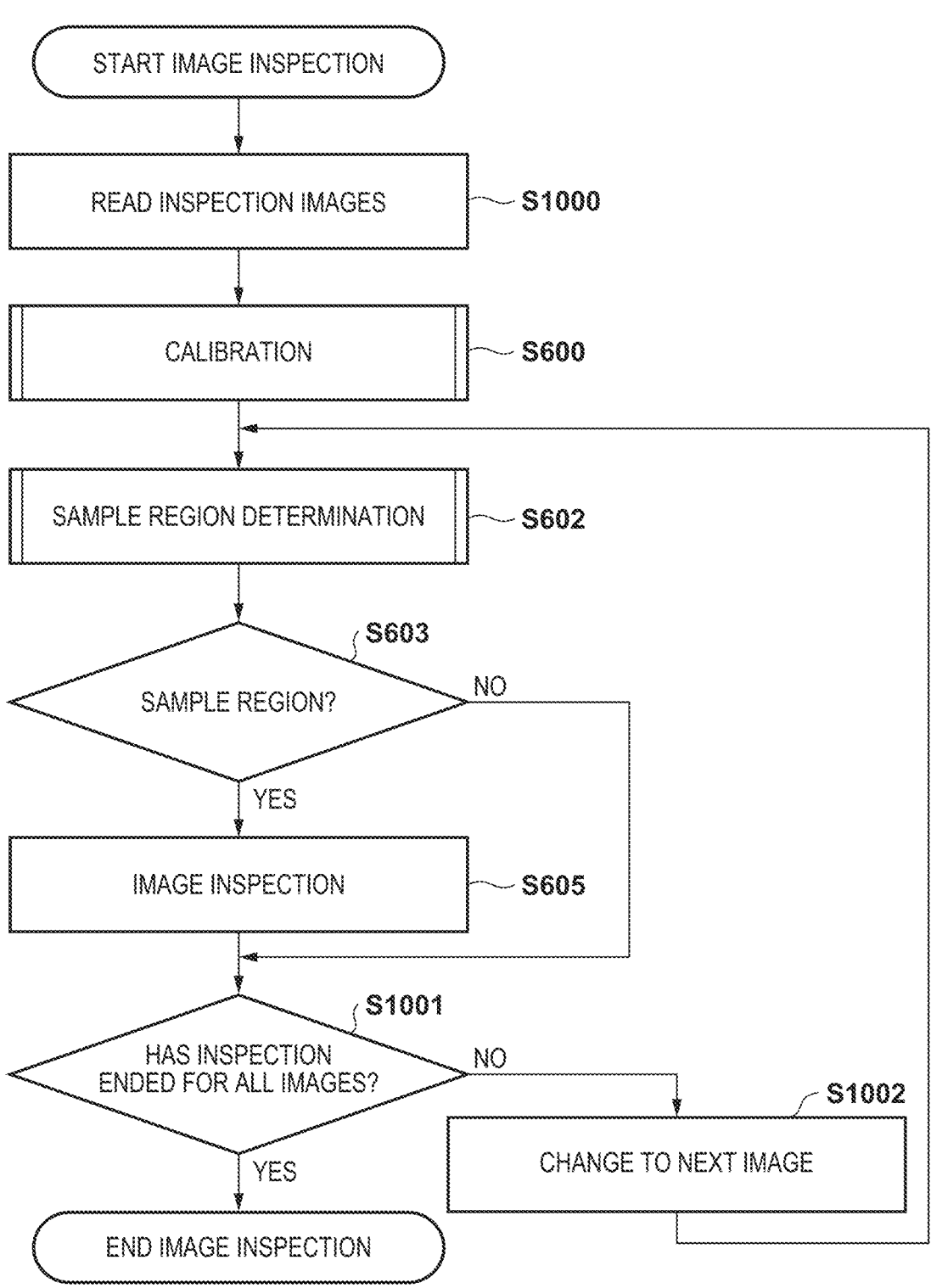

F I G. 11

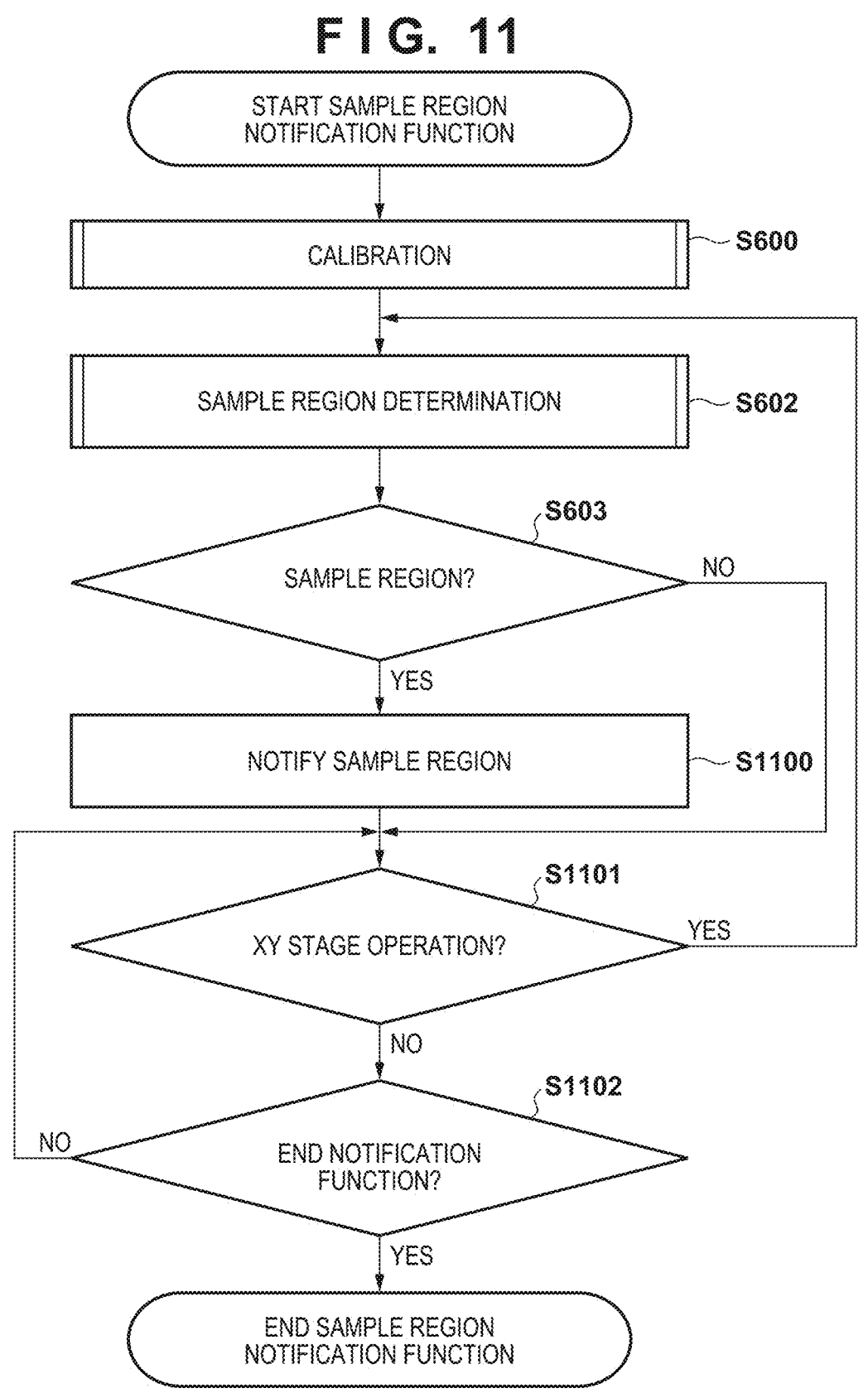

```
     ┌─────────────────────────────┐
     │  START SAMPLE REGION        │
     │  NOTIFICATION FUNCTION      │
     └─────────────────────────────┘
                  │
                  ▼
     ┌─────────────────────────────┐
     ║       CALIBRATION           ║──── S600
     └─────────────────────────────┘
                  │
                  ▼
     ┌─────────────────────────────┐
     ║  SAMPLE REGION DETERMINATION║──── S602
     └─────────────────────────────┘
                  │
                  ▼
              ◇ S603
      ╱  SAMPLE REGION?  ╲───── NO
      ╲                  ╱
              │ YES
              ▼
     ┌─────────────────────────────┐
     │     NOTIFY SAMPLE REGION    │──── S1100
     └─────────────────────────────┘
              │
              ▼
           ◇ S1101
    ╱  XY STAGE OPERATION?  ╲──── YES
    ╲                       ╱
           │ NO
           ▼
        ◇ S1102
 NO ──╱ END NOTIFICATION ╲
      ╲   FUNCTION?      ╱
           │ YES
           ▼
     ┌─────────────────────────────┐
     │   END SAMPLE REGION         │
     │   NOTIFICATION FUNCTION     │
     └─────────────────────────────┘
```

IMAGE PROCESSING APPARATUS, IMAGE PROCESSING METHOD, MICROSCOPE SYSTEM, AND STORAGE MEDIUM

CROSS-REFERENCE TO RELATED APPLICATIONS

This application is a Continuation of International Patent Application No. PCT/JP2022/048567, filed Dec. 28, 2022, which claims the benefit of Japanese Patent Application No. 2022-060796, filed Mar. 31, 2022, both of which are hereby incorporated by reference herein in their entirety.

BACKGROUND OF THE INVENTION

Field of the Invention

The present invention relates to an image processing apparatus, an image processing method, a microscope system, and a storage medium.

Background Art

A known technique searches for a region corresponding to an observation target by capturing an image with a camera installed in a microscope (PTL 1, PTL 2).

In the technique described in PTL 1, the presence/absence of a sample is determined on the basis of the contrast value of an image captured while moving the sample on a motorized stage in a plane (XY plane) orthogonal to the optical axis of a lens of the microscope. In the technique described in PTL 2, a plurality of images captured while moving a stage in the XY direction are arranged side-by-side and reconfigured as a low magnification image. The reconfigured image is displayed on a display apparatus. When the user designates a predetermined position on the low magnification image displayed on the display apparatus, a high magnification image of the designated position is obtained.

CITATION LIST

Patent Literature

PTL 1: Japanese Patent Laid-Open No. 2016-51167
PTL 2: Japanese Patent Laid-Open No. 2010-282229

With the technique of PTL 1, to determine the sample by an appropriate contrast value, an operation to adjust the focus by a field of view including the sample to be observed needs to be performed in advance. With the technique of PTL 2, when observing a sample at high magnification, using the reconfigured low magnification image, the user needs to visually check and designate the sample region.

The present invention has been made in consideration of the aforementioned problems and realizes a technique that can easily detect a region corresponding to an observation target by a microscope even in an out-of-focus state.

SUMMARY OF THE INVENTION

To solve the issue described above, an image processing apparatus according to the present invention has the following configuration, for example. The image processing apparatus comprising: an obtaining unit configured to obtain image data captured via a microscope; a first color information obtaining unit configured to obtain first color information from the image data; and a detecting unit configured to detect a region corresponding to an observation target from the image data, wherein the first color information is information relating to saturation, and the detecting unit detects a region with a value for saturation based on the first color information that is greater than a predetermined threshold as the region corresponding to the observation target of the image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram for describing a sample region detection process in a focused state according to an embodiment.

FIG. 5A is a graph of the average values for saturation of a captured image in a focused state.

FIG. 5B is a graph of the contrast values of a captured image in a focused state.

FIG. 5C is a graph of the average values for saturation of a captured image in a non-focused state.

FIG. 5D is a graph of the contrast values of a captured image in a non-focused state.

FIG. 6 is a flowchart illustrating the flow of inspection processing of an inspection apparatus according to an embodiment.

FIG. 7 is a flowchart illustrating the flow of calibration processing according to an embodiment.

FIG. 8 is a flowchart illustrating the flow of sample region determination processing according to an embodiment.

FIG. 9A is an overall view for describing a prepared slide.

FIG. 9B is an enlarged view for describing a prepared slide (1).

FIG. 9C is an enlarged view for describing a prepared slide (2).

FIG. 10 is a flowchart illustrating an example of the overall inspection processing in the image processing apparatus according to an embodiment.

FIG. 11 is a flowchart illustrating an example of sample region notification function processing according to an embodiment.

DESCRIPTION OF THE EMBODIMENTS

First Embodiment

Figure 1:
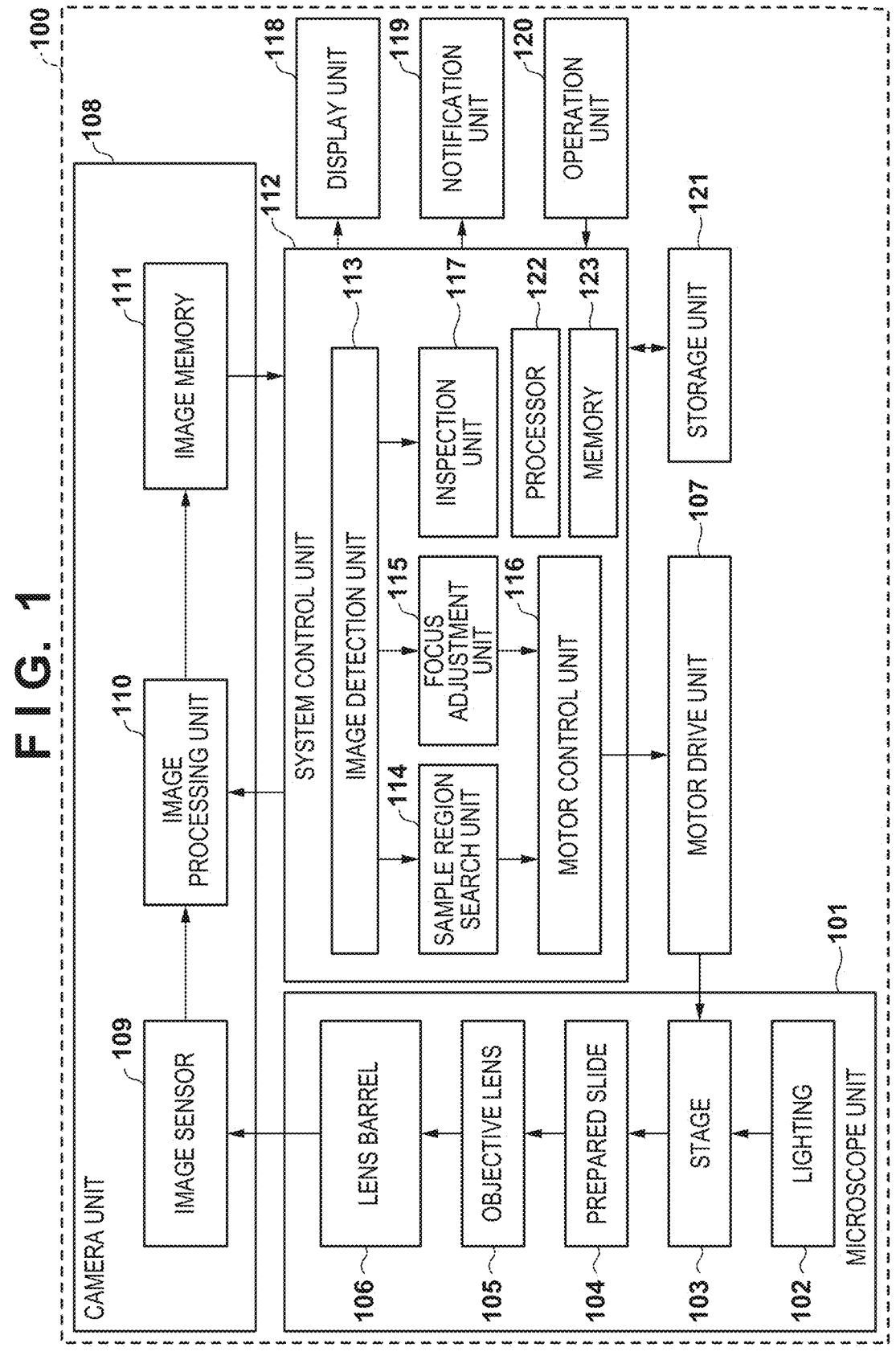
FIG. 1 is a block diagram illustrating an example of the configuration of a microscope system according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Example of Configuration of Microscope System

An example of the configuration of a microscope system 100 according to the present embodiment will now be described with reference to FIG. 1. Note that one or more functional blocks illustrated in FIG. 1 may be implemented by hardware, such as an application-specific integrated circuit (ASIC) or a programmable logic array (PLA), or implemented by a programmable processor, such as a central processing unit (CPU) or a microprocessing unit (MPU), executing software. Also, these may be implemented by a combination of software and hardware.

A microscope unit 101 includes lighting 102, a stage 103, a prepared slide 104, an objective lens 105, and a lens barrel 106. In the present embodiment, an image captured by a camera unit 108 is displayed on a display unit 118. However, in another embodiment, the user can observe the sample directly via an eyepiece lens. The lighting 102 includes a light source that emits light and an optical system that gathers the light of the light source. Light gathered from the light source is emitted at the prepared slide 104 held on the stage 103. The transmitted light of the prepared slide 104 travels through the objective lens 105 and the lens barrel 106 and is received as an image of the sample on the imaging plane of an image sensor 109 of the camera unit 108.

The stage 103 includes an XY stage that moves the prepared slide 104 in a direction (XY direction) orthogonal to the optical axis of the objective lens 105 and a Z stage that moves the prepared slide 104 in the optical axis direction (Z direction) of the objective lens 105. By moving the stage 103 in the XY direction, the region corresponding to an observation target can be put in the field of view of the objective lens 105. Also, by moving the stage 103 in the Z direction, the focus can be adjusted. Focus adjustment can be performed by adjusting the relative distance between the prepared slide 104 and the objective lens 105. In other words, it is not limited to a configuration in which the stage 103 is moved in the Z direction, and may be a configuration in which the objective lens 105 is moved in the Z direction, for example. The stage 103 is driven by an actuator such as a stepping motor or the like. A motor drive unit 107 is a motor driver for driving the actuator and includes an IC with a built-in H-bridge circuit or the like. The motor drive unit 107 drives according to a drive signal output from a motor control unit 116 included in a system control unit 112 described below. In a case where a stepping motor is used as the actuator, the drive signal output from the motor control unit 116 is a biphasic rectangular wave 90° out of phase or a sine wave. The actuator that drives the stage 103 is not limited to a stepping motor, and other examples include a DC motor that drives an electromagnetic motor via direct current signals, an ultrasonic motor that drives by a piezoelectric element being vibrated by alternating current signals of a frequency in the ultrasonic band, and the like. The configuration is not limited to driving the stage 103 via electrical power using an actuator, and a configuration in which a driving mechanism is manually operated via an operation member such as a wheel may be used.

The prepared slide 104 includes a glass slide, cover glass, and a sample to be observed. The cover glass has the role of protecting the sample and the like, but depending on the sample, a configuration that does not use a cover glass may be used. A method in which a sample is stained a specific color for observation may be used for observing a colorless and transparent sample. An example of a staining method for staining bacteria includes Gram staining. Gram staining includes staining a sample using a predetermined dye, washing and drying the sample, and preparing a prepared slide. When the prepared prepared slide is observed with an optical microscope, Gram-positive bacteria appear dark purple in color and Gram-negative bacteria appear red in color. Also, the bacteria are classified by shape into bacilli and cocci. Gram staining is a staining method used in infectious disease testing. By applying the present embodiment to an inspection apparatus, infectious disease testing can be quickly performed. The objective lens 105 is a lens that optically enlarges the image of the sample.

The camera unit 108 includes the image sensor 109, an image processing unit 110, and an image memory 111. The image sensor 109 is a charge-coupled device (CCD) image sensor, a complementary metal oxide semiconductor (CMOS) image sensor, or the like. The image sensor 109 converts the received light into an electrical signal of the subject image by photoelectric conversion to generate an image signal. The image signal generated by the image sensor 109 is input into the image processing unit 110. At the image processing unit 110, a processor for image processing called an image signal processor (ISP) computes the various types of processing such as pixel interpolation processing and color conversion processing at high-speeds. The post-processing image data is stored in the image memory 111. The image memory 111 is a storage device such as a dynamic random access memory (DRAM), a static random access memory (SRAM), or the like. The control commands for the image processing unit 110 and image data stored in the image memory 111 are exchanged with the system control unit 112 via a communication interface such as USB.

The system control unit 112 includes an image detection unit 113, a sample region search unit 114, a focus adjustment unit 115, the motor control unit 116, and an inspection unit 117. The system control unit 112 further includes one or more processors 122 such as a CPU and a memory 123. The functions of the units of the system control unit 112 such as the image detection unit 113 are implemented by the processor 122 loading a program stored in a storage unit 121 onto the memory 123 and executing the program. The image detection unit 113 detects the color information and contrast value from the image data generated by the camera unit 108. The image data is converted into numerical values corresponding to a combination of RGB (red, green, blue) elements. The image detection unit 113 converts the RGB image data in a different color space via a known conversion method. In the present embodiment, HSV color space color space is used. HSV color space is a color space of three components: hue, saturation, and value. Hue is a component representing the type of color and is represented by a color circle from 0° to 360°. Saturation is a component representing the intensity of color, with colors with a lower saturation appearing as a dull color such as gray. Value is a component representing the brightness of color. In the case of an achromatic color (a color that satisfies R=G=B), lower values approach black and higher values approach white. The image detection unit 113 functions as a first color information obtaining unit that obtains saturation color information from the image data and also functions as a second color information obtaining unit that obtains hue and value color information from the image data.

Each component of HSV can be converted using the following (1) to (3) conversion formulas from RGB.

[Math. 1]

$$H = \begin{cases} 60 \times \dfrac{G-R}{MAX-MIN} + 60 \ (MAX = R) & (1) \\ 60 \times \dfrac{B-G}{MAX-MIN} + 120 \ (MAX = G) \\ 60 \times \dfrac{R-B}{MAX-MIN} + 240 \ (MAX = BB) \\ 0 \ (MIN = MAX) \end{cases}$$

$$S = MAX - MIN \qquad (2)$$

$$V = MAX \qquad (3)$$

MAX: Maximum value for R, G, B

MIN: Minimum value for R, G, B

In a case where, of the calculated components of HSV, the saturation is equal to or greater than a predetermined threshold, the image detection unit 113 determines that the region of the captured image is a sample region. The sample region search unit 114 searches for a region where the sample to be observed exists by moving the stage 103 in the XY direction via the motor control unit 116 and the motor drive unit 107 on the basis of the sample region determination result. Also, to determine whether or not the focus is on the entire region of the image data or a certain region, the contrast value is calculated from the image by the image detection unit 113. The contrast value can be calculated by computing the differential values of the image using a known image filter for the entire region of the image or a certain region. The contrast value is higher when it is in focus (a focused state) and lower when it is not in focus (non-focused state). The focus adjustment unit 115 adjusts the focus by moving the stage 103 in the Z direction via the motor control unit 116 and the motor drive unit 107 on the basis of the contrast value detected by the image detection unit 113.

The inspection unit 117 automatically performs various types of tests on the sample enlarged via the microscope unit 101 from the analysis results of the image from the image detection unit 113. For example, from an image of the sample showing saliva, blood, tissue, cells, or the like, infectious disease testing can be performed by the inspection unit 117 to automatically determine the presence/absence of bacteria or the type of bacteria. A type of bacteria determination can be performed using a machine learning model trained in advance to classify bacteria into types, for example. Also, in another configuration, instead of being applied to medical testing, the inspection unit 117 may be applied to an inspection apparatus for the inspection of the external appearance of components in an electronic component manufacturing process, for example.

The display unit 118 is a display device such as a thin film transistor liquid crystal display (TFT LCD), for example, that displays images captured by the camera unit 108 and specific information (information of a sample region detected by the image detection unit 113, inspection results of an inspection by the inspection unit 117, and the like). Also, by displaying the captured image data in real time as a live view, the observation target can be checked without using the eyepiece lens.

A notification unit 119 is a device that communicates the state using sound, light, vibration, and the like of a speaker, LED, vibrator, and the like. The notification unit 119 communicates the determination result of the sample region detected by the image detection unit 113 and the like.

An operation unit 120 is an operation member such as a wheel for operating the stage 103. The operation amount of the operation unit 120 is detected by the system control unit 112, and the stage 103 is moved in the XY direction or the Z direction via the motor control unit 116 and the motor drive unit 107 according to the detected operation amount. Also, in another configuration, the operation unit 120 may directly operate the stage 103, bypassing the motor control unit 116 and the motor drive unit 107. This allows searching for the sample to be observed and focus adjustment to be performed manually.

The storage unit 121 is a non-volatile memory such as a flash memory. By storing the image data temporarily stored in the image memory 111 in the storage unit 121, the image data can be stored even when the power of the microscope system 100 is turned off. Also, the storage unit 121 stores programs executed by the system control unit 112, various types of settings, and other similar information.

The microscope system 100 can be configured as a system in combination with general-purpose devices. For example, a general-purpose USB camera can be used as the camera unit 108. Also, a personal computer (PC) can be used as the system control unit 112 and the storage unit 121. In this case, the PC is an example of an image processing apparatus according to the present embodiment, but the image processing apparatus is not limited to being a PC and may be another electronic device such as a tablet terminal. As the display unit 118 and the operation unit 120, a display, a keyboard, or other general-purpose peripheral apparatuses may be used. Alternatively, a PC may be used as the system control unit 112, the storage unit 121, the display unit 118, the notification unit 119, and the operation unit 120. Also, the microscope system 100 may be a dedicated apparatus integrally formed with the microscope unit 101, the camera unit 108, the system control unit 112, and the like. In this case, the processing of the system control unit 112 can be executed by a dedicated embedded microcomputer. Also, in another configuration, the devices of the camera unit 108 and the system control unit 112 may be shared. For example, the image memory 111 may be shared, and image data generated by the image processing unit 110 may be input directly to the image detection unit 113 via the image memory 111 bypassing a communication interface such as USB. Also, the image data generating processing of the image processing unit 110 and the color information and contrast value calculating processing of the image detection unit 113 may be configured to be executed with a common ISP.

Sample Region Detection Processing

Figure 2A:
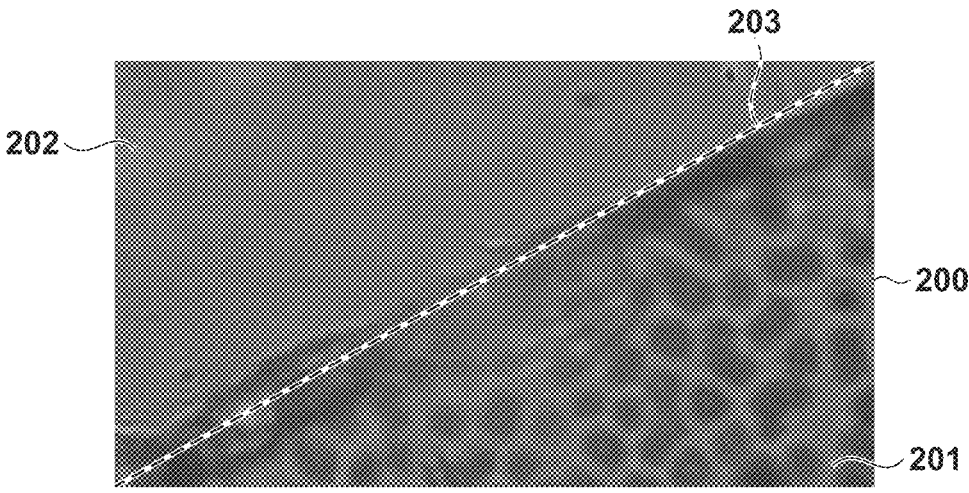
FIG. 2A is a diagram (1) illustrating an example of a sample, a captured sample of blood.
Figure 2B:
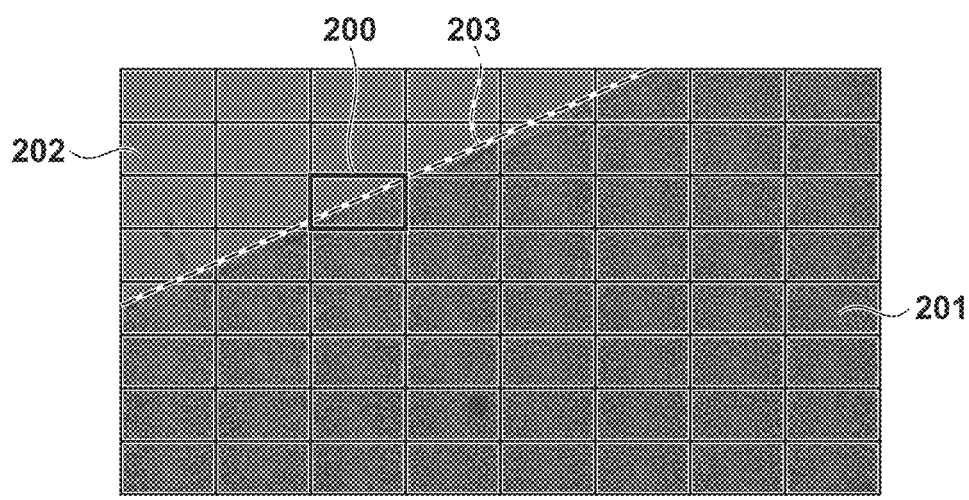
FIG. 2B is a diagram (2) illustrating an example of a sample, a captured sample of blood.

Next, the sample region detection processing of the image detection unit 113 will be described with reference to FIGS. 2A to 5D. FIGS. 2A and 2B illustrate examples of images captured by the camera unit 108 of a blood sample as an example of the sample. The plurality of circle regions shown in the lower side of the image are red blood cells, and in a color image, these regions are reddish images. Also, the regions without red blood cells are greyish images of the glass slide.

FIG. 2A is an image captured by the objective lens at high magnification. FIG. 2B is a composite image of a plurality of images captured by the objective lens as in FIG. 2A while moving the stage 103 in the XY direction combined into one image. FIG. 2A is one of the combined images in FIG. 2B, and an overall angle of view 200 of FIG. 2A corresponds to the angle of view 200 of a portion of FIG. 2B. In the present embodiment, for the sake of convenience, one image captured by the objective lens at a high magnification as in FIG. 2A will be referred to as a captured image, and an image obtained by combining captured images as in FIG. 2B will be referred to as a composite image. Also, in the present embodiment, the region including the sample in the image will be referred to as a sample region, and a region not including the sample will be referred to as a non-sample region. In FIGS. 2A and 2B, a region 201 below a dashed line 203 showing red blood cells is the sample region, and a region 202 above the dashed line 203 is the non-sample region.

FIG. 3 illustrates a sample region detection process. 300 denotes the same image as FIG. 2B and is a composite image obtained by capturing while moving the stage 103 in the XY direction. Images 301 to 303 are images obtained by converting the image 300 into a HSV color space, with each components represented in greyscale. 301 denotes the hue image, 302 denotes the saturation image, and 303 denotes the value image. Lower values for each component approach black in appearance, and higher values approach white in appearance. By comparing the sample region and the non-sample region of the image 302, the saturation image, it can be seen that the non-sample region appears as a color close to black (in other words, the pixel value is low). Before combining the captured images, the saturation is averaged for each captured image and converted into a greyscale image. Thereafter, the captured images are combined to form an image 304. By averaging the saturation, the effects of a low-pass filter for saturation can be obtained. 305 is an image obtained by converting the image 304 into a binary image using a predetermined threshold. In other words, this shows that the white region is determined to be the sample region and the black region is determined to be the non-sample region. From this, it can be seen that the sample region and the non-sample region can be distinguished on the basis of the saturation of the image.

Figure 4:
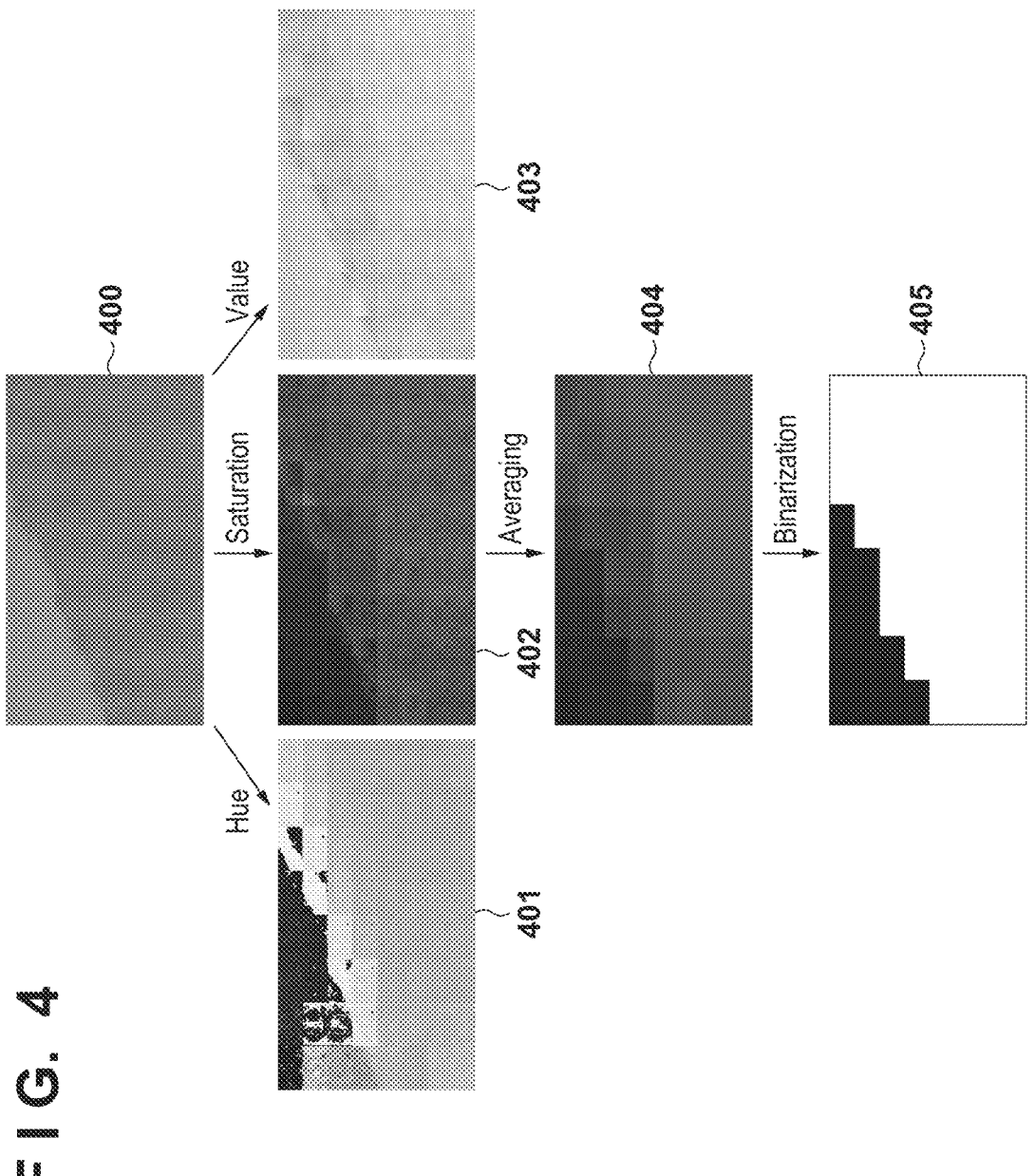
FIG. 4 is a diagram for describing a sample region detection process in a non-focused state according to an embodiment.

FIG. 4 illustrates the sample region detection process in a case where the stage 103 is moved in the Z direction to be in an out-of-focus state. Images 400 to 405 of FIG. 4 correspond to the images 300 to 305 of FIG. 3 and thus will not be described in detail. The binary image 405 obtains a similar effect as the image 305. Accordingly, even when the captured images are in an out-of-focus state, it can be seen that the sample region and the non-sample region can be distinguished on the basis of the saturation of the image.

FIGS. 5A to 5D are graphs of the average value of the saturation of the captured images of FIGS. 3 and 4 and the contrast values. The data calculated for each of the captured images of the left end single column is plotted in order from the top. In other words, the first point on the graph is the data of the upper-left captured image of FIGS. 3 and 4, the non-sample region, and the last point on the graph is the data of the lower-left captured image, the sample region. FIGS. 5A and 5B are graphs of the average value of saturation and the contrast value of FIG. 3, which is an image in a focused state. FIGS. 5C and 5D are graphs of the average value of saturation and the contrast value of FIG. 4, which is an image in a non-focused state. It can be seen from FIGS. 5A and 5C that, irrespective of the focused state/non-focused state, the sample region can be distinguish when the saturation is equal to or greater than the predetermined threshold (for example, 25) and the non-sample region can be distinguished when the saturation is less than the threshold. Also, when comparing the contrast values of the images of FIGS. 5B and 5D, the contrast values in a non-focused state are approximately the same for the sample region and the non-sample region. Thus, it is difficult to distinguish between the regions on the basis of the contrast value. As described above, according to the present embodiment, irrespective of whether the captured images are in a focused state or a non-focused state, the sample region and the non-sample region can be distinguished between using the saturation of the images.

Inspection Apparatus Processing

Next, the processing of the inspection apparatus provided with the functions of the microscope according to the present embodiment will be described with reference to FIGS. 6 to 9C. The inspection apparatus includes, for example, the microscope unit 101, the camera unit 108, the motor drive unit 107, the system control unit 112, and storage unit 121, the display unit 118, and the operation unit 120. The control of the inspection apparatus, unless explicitly mentioned, is performed on the basis of control commands of the system control unit 112.

First, an example of the overall processing for inspection using the inspection apparatus will be described with reference to FIG. 6. Note that each item of processing executed by the system control unit 112 may be implemented by the processor 122 executing a program stored in the storage unit 121 or the memory 123.

When inspection starts, in S600, the system control unit 112 executes calibration. The calibration processing will now be described with reference to FIG. 7.

In S700, the field of view of the objective lens 105 is moved to a position corresponding to the non-sample region via the XY stage of stage 103 by the motor control unit 116 and an image is captured by the camera unit 108. The position corresponding to the non-sample region may be set in advance to a position on the prepared slide 104 where the sample is not placed, and the stage 103 may be moved to that position by the motor control unit 116. Also, the user may check the live view of the display unit 118 and operate the operation unit 120 and move the field of view of the objective lens 105 (via the motor control unit 116) to capture the region not including the sample.

In S701, the system control unit 112 corrects the white balance (WB). WB correction includes setting the gain for each RGB component so that the image of the non-sample region captured in S700 is an achromatic color. The gain calculation method includes first calculating the RGB average value of the entire captured image of the non-sample region. For example, if the average value of each component of the captured image is R=230, G=200, and B=200, the RGB average value is 210. Also, the system control unit 112 sets the gain so that each component has a RGB average value of 210. In other words, the system control unit 112 sets the gain to R=210/230=0.91, G=210/200=1.05, and B=210/200=1.05. By setting the RGB gain calculated in S700 in the image processing unit 110, the image data captured in the subsequent processing is corrected by applying the gain described above to each RGB component and stored in the image memory 111. With this correction, images captured of the non-sample region are made achromatic color images with a saturation of close to 0.

In S702, the system control unit 112 sets the threshold for the saturation for determining the sample region in the image detection unit 113. The saturation threshold is the saturation obtained (calculate) from the pre-captured sample region and the non-sample region, and the threshold enabling the sample region and the non-sample region to be distinguished between is stored in the storage unit 121. Also, a configuration in which the user directly sets the threshold or a configuration in which the threshold to set is changed depending on the type of the sample to be inspected may be used. An example of the sample to be observed according to the present embodiment is an image with a relatively high saturation of a colored or stained sample of blood or the like.

Also, by performing WB correction in S701, the non-sample region is corrected to a low saturation image. Accordingly, the difference in saturation between the image of the sample region and the image of the non-sample region is made significantly large, allowing the inspection robustness to be improved.

In S703, the motor control unit 116 moves the Z stage of the stage 103 to a position corresponding to the operation distance of the objective lens. The operation distance is, by design, a distance set per objective lens from the tip of the objective lens to the observation target when in focus. In a case where the focus is greatly out of focus, trying to capture an image of the observation target results in only an image with low saturation. In this case, the Z stage is moved the operation distance, which is the focusing distance designed in advance. However, in a case where the subject depth is shallow or the sample is thick, the focus cannot always be put in a focused state by moving the stage 103 the operation distance. In other words, the processing of S703 is for moving the focus to a position where, even without being in a focused state, an image with distinguishable color can be captured. As described above, calibration processing is executed in S700 to S703. Note that the system control unit 112 may store the setting values of the RGB gain of the WB correction of S701 in the storage unit 121 and obtain these setting values upon the start of an inspection so that the WB correction values do not need to be calculated each time.

Now we will return to FIG. 6. After calibration ends in S600, in S601, the sample region search unit 114 moves the XY stage of the stage 103 via the motor control unit 116 and the motor drive unit 107 to the sample region search start position. In S602, the image detection unit 113 executes processing to determine the sample region. The present processing will be described with reference to FIG. 8.

In S800, the image detection unit 113 obtains the image data captured and stored in the image memory 111 for sample region determination. In S801, the image detection unit 113 obtains (calculates) the saturation of each pixel of the image data obtained in S800 using Formula (2). In S802, the saturation obtained (calculated) in S801 is averaged for the entire image or for each divided region.

In S803, the image detection unit 113 determines whether the average value of the saturation calculated in S802 is greater than the threshold set in S702. For example, the image detection unit 113 compares the saturation average value obtained in S802 and the threshold set in S702 of FIG. 7. If the saturation average value is greater than the threshold, the processing proceeds to S804. Otherwise, the processing proceeds to S805.

In S804, the image detection unit 113 determines the region of the captured image to be the sample region. In S805, the image detection unit 113 determines the region of the captured image to be the non-sample region. In this manner, via the processing from S800 to S805, the image detection unit 113 can determine whether or not the sample region is included in the captured image (irrespective of whether the focus is in a focused state or an out-of-focus state).

The region for which the saturation average value is calculated will now be described with reference to FIGS. 9A to 9C. FIGS. 9A to 9C illustrate an overall view and an enlarged view of the prepared slide 104. FIG. 9A is an overall view of the prepared slide 104. The arrows in FIG. 9A indicate an example of the order in which the sample region search unit 114 searches for the sample. The sample region search start position described with reference to S601 is the lower-right position of the prepared slide 104, which is the arrow start position. Also, 900 denotes a sample applied to the glass slide of the prepared slide 104. FIG. 9B is an enlarged view of the region near the sample region of the prepared slide 104 in the case of a 5×5 composite image. FIG. 9C is an enlarged view of a captured image 901 of the composite image of FIG. 9B. 902 of FIG. 9C denotes a certain region of the 16 divided regions of the entire region of the captured image 901.

The sample region 900 of FIG. 9C takes up a small proportion with respect to the entire region of the captured image 901. Thus, when the saturation is averaged for the entire captured image, the result will still be a low value for saturation. Thus, despite the captured image including the sample region, it will be determined to be a non-sample region. Here, by dividing the captured image into a plurality of regions and averaging the saturation for each divided region, sample regions can be detected even when the sample region is small. In the threshold determination processing of S803, in a case where the average value of the saturation calculated for a divided region is greater than a threshold for at least one or more regions, it is determined that the captured image includes a sample region. However, if the number of divisions in the region increases, there is the possibility of the arithmetic processing of the image detection unit 113 taking a longer amount of time, noise being detected and causing a false determination of a sample region, and the like. Thus, in order to perform an inspection quickly and without false determinations, the number of divisions in the region for which the saturation is to be averaged needs to be appropriately set. The method for setting the division number may include setting a design value determined via experiments and the like as the number of divisions. However, instead of setting the number of divisions to a predetermined design value, the image detection unit 113 may obtain the objective lens magnification, the image zoom magnification, and the like and automatically change the number of divisions. Also, the number of divisions may be set by accepting the setting by a user, or the image detection unit 113 may set an appropriate number of divisions in response to accepting the selection of the type and size of the sample to be inspected. When the image detection unit 113 ends the sample region determination processing of S602, the processing returns to the call source.

Now we will return to FIG. 6. In S603, in a case where it is determined by the processing of S602 that the image does not include a sample region, the system control unit 112 proceeds the processing to S606. In a case where it is determined by the processing of S602 that the image does include a sample region, the processing proceeds to S604.

In S604, the focus adjustment unit 115 automatically adjusts the focus by moving the Z stage of the stage 103 via the motor control unit 116 and the motor drive unit 107 until the contrast value detected by the image detection unit 113 is in the focused state. A known algorithm used in camera contrast AF function and the like can be used as the automatic focus adjustment method.

In S605, the system control unit 112 re-captures an image in the focused state and performs various types of inspections on the captured image using the image detection unit 113 and the inspection unit 117. The image inspection processing may include a rule-based image analysis method, a method of deducing the inspection target using machine learning such as deep learning and the like. The inspection unit 117 determines the various types of inspection results on the basis of the results of the image detection processing.

In S606, the system control unit 112 determines whether or not inspection has ended. In the case of an infectious disease inspection apparatus, for example, if no bacteria is detected after the sample region search unit 114 searches the entire search range or if the sample region search unit 114 detects bacteria and the inspection unit 117 determines the bacteria type, the system control unit 112 determines that the inspection has ended. In a case where the system control unit 112 determines that the inspection has not ended, the processing proceeds to S607. Otherwise, the present processing ends.

In S607, the system control unit 112 moves the XY stage of the stage 103 via the motor control unit 116 and the motor drive unit 107 in order to determine the sample region in the next field of view. Thereafter, until it is determined that the inspection has ended in S606, the processing from S602 to S607 is repeated.

As described above, in the present embodiment, when determining whether or not image data includes a region corresponding to an observation target, a region in the image with saturation (for example, an average value) that is greater than a predetermined threshold is determined to be a region corresponding to an observation target. In this manner, even in an out-of-focus state, the region corresponding to an observation target can be easily observed with a microscope.

Second Embodiment

In the inspection apparatus according to the first embodiment described above, after the stage 103 is moved by the motor control unit 116 and the motor drive unit 107 and the sample region is searched for, an inspection via the inspection unit 117 is performed using the captured images. In an image processing apparatus according to the second embodiment described below, the inspection unit 117 performs an inspection on an image stored in the storage unit 121. Note that configurations and processing which are essentially the same as in the first embodiment are given the same reference number and the descriptions thereof are omitted. The differences will be focused on in the following description.

The processing of the image processing apparatus according to the present embodiment will now be described with reference to FIG. 10. FIG. 10 illustrates an example of the overall inspection processing of the image processing apparatus. Note that each item of processing executed by the system control unit 112 may be implemented by the processor 122 executing a program stored in the storage unit 121 or the memory 123.

When image inspection starts, in S1000, the system control unit 112 reads out a plurality of images to be inspected selected by the user from the storage unit 121. The images to be inspected are not limited to images captured in advance by the microscope system 100 and may be images captured by a different microscope or inspection apparatus. When the system control unit 112 reads out the images from the storage unit 121, the processing proceeds to S600.

In S600, the system control unit 112 executes the calibration described in the first embodiment. The non-sample region images used in the calibration may be selected from the selected images, or other images captured for calibration may be used. Also, instead of the calibration processing, design values stored in the storage unit 121 may be used. When the calibration of S600 has ended, the system control unit 112 proceeds the processing to S602.

In S602, as in the first embodiment, the image detection unit 113 determines, for the first image read out from the storage unit 121, whether the region of the image is a sample region (S800 to S805 described above). In S603, in a case where the image detection unit 113 determines that the image includes a sample region, the processing proceeds to S605. Otherwise, the processing proceeds to S1001.

In S605, the image detection unit 113 and the inspection unit 117 execute various types of image inspection on the image as in the first embodiment. In S1001, the system control unit 112 determines whether or not sample region determination and inspection has ended for all of the images read out in S1000. In a case where the system control unit 112 determines that determination and inspection for all of the images has not ended, until the processing for all of the images is executed, the images to be inspected in S1002 is changed and the processing of S602, S603, and S605 is repeated. In a case where the system control unit 112 determines that determination and inspection on all of the images has ended, the present processing ends.

In the present embodiment described above, the image processing apparatus reads out a plurality of images to be inspected from the storage unit 121, determines whether a region of each image is a sample region, and executes various types of inspections if the image is a sample region. In this manner, for images captured in advance by the microscope system 100 or images captured by a different microscope or inspection apparatus, even in an out-of-focus state, the region corresponding to an observation target can be easily observed with a microscope.

Third Embodiment

Next, the third embodiment will be described with reference to FIG. 11. The third embodiment relates to a notification function for communicating the sample region in addition to the operations described in the first and second embodiment. Specifically, in the third embodiment, in a case where a sample is visually observed by manually operating the stage 103 by the operation unit 120, the user is notified of the detection of a sample region. Note that configurations and processing other than the notification processing in the microscope system according to the present embodiment are the same or essentially the same as in the embodiments described above. Thus, the same configurations and processing are given the same reference numbers and the descriptions thereof are omitted.

The operations of the sample region notification processing according to the present embodiment will now be described with reference to FIG. 11. Note that each item of processing executed by the system control unit 112 of the present processing may be implemented by the processor 122 executing a program stored in the storage unit 121 or the memory 123.

When the sample region notification processing starts, first, the processing from S600 to S603 is executed by the control of the system control unit 112 as in the first embodiment. Via this processing and after the calibration, whether or not the regions of the image are sample regions are determined. In a case where the captured image is determined to not be a sample region in S603 by the system control unit 112, the processing proceeds to S1101. In a case where the captured image is determined to be a sample region by the system control unit 112, the processing proceeds to S1100.

In S1100, the notification unit 119 notifies the user that the currently observed image include a sample region via the control of the system control unit 112. The notification method of the notification unit 119 may include a method of notifying the user via a notification sound, a method of notifying the user via light or vibration using an LED or a vibrator, and the like. Also, a color indicating that the image displayed on the display unit 118 is a sample region may be superimposed on the image for display.

In S1101, the system control unit 112 determines whether or not the XY stage of the stage 103 has been operated via the operation unit 120. In a case where the system control unit 112 determines that the XY stage has been operated, the processing returns to S602 (because of the possibility of the observed field of view being changed). Otherwise, the processing proceeds to S1102.

In S1102, the system control unit 112 determines whether or not the sample region notification function has ended. In a case where the system control unit 112 determines that the notification function has not ended, the processing returns to S1101. In a case where the system control unit 112 determines that the notification function has ended, the present processing ends.

As described above, in the present embodiment, when the XY stage is operated, the sample region determination is performed. Then, if a sample region appears in the observed field of view, the user is notified. In this manner, even if it is difficult to visually confirm the sample due to the sample being too small in the field of view due to the magnification of the objective lens or due to the color of the sample being too light, the sample can be easily put in the field of view of the microscope.

According to the present invention, even in an out-of-focus state, a region corresponding to an observation target can be easily observed with a microscope.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more processors or circuitry configured to perform functions of the following units;
an obtaining unit configured to scan, by a microscope, a region in which an observation target is arranged and obtain a plurality of image data corresponding to different positions from each other;
a first color information obtaining unit configured to, for each of the plurality of image data, calculate saturation of each pixel of the image data and obtain an average value of the saturation of each pixel as an average value of the saturation for each image data;
a composite image generating unit configured to generate a composite image composed of a plurality of pixels corresponding to the plurality of image data; and
a detecting unit configured to detect a region corresponding to the observation target in the plurality of image data, wherein
the composite image generating unit generates the composite image by assigning the average value of the saturation obtained for the image data as a pixel value to a pixel position corresponding to each of the plurality of image data, and
the detecting unit further detects, in the composite image, a region including a pixel having a pixel value greater than a predetermined threshold as the region corresponding to the observation target in the plurality of image data.

2. The image processing apparatus according to claim 1, wherein the one or more processors or circuitry are further configured to perform functions of a determining unit configured to determine whether the image data of the plurality of image data includes a region corresponding to the observation target, wherein
the determining unit determines, in the composite image, a region including a pixel having a pixel value greater than the predetermined threshold as the region corresponding to the observation target, and
the detecting unit detects the region corresponding to the observation target according to determination by the determining unit.

3. The image processing apparatus according to claim 2, wherein the one or more processors or circuitry are further configured to perform functions of a second color information obtaining unit configured to obtain second color information from the image data, wherein
the second color information is hue and value information, and
the determining unit determines, in the composite image, the region corresponding to the observation target regardless of a value relating to hue and value based on the second color information.

4. The image processing apparatus according to claim 2, wherein the one or more processors or circuitry are further configured to perform functions of
a correcting unit configured to correct the image data by applying a predetermined gain to each RGB component of the image data, wherein
the predetermined gain is gain set so that saturation of a specific region without the observation target approaches an achromatic color when the correcting unit corrects image data obtained by capturing the specific region, and
the determining unit determines whether the image data includes a region corresponding to the observation target using image data corrected by the correcting unit.

5. The image processing apparatus according to claim 1, wherein the observation target is stained via a predetermined staining method.

6. The image processing apparatus according to claim 1, wherein the number of regions into which the image data is divided is set on a basis of any one of objective lens magnification, zoom magnification of the image data, and type of the observation target and size of the observation target.

7. An inspection apparatus comprising:

an objective lens that optically enlarges an image of an observation target;

an image sensor configured to capture an image via the objective lens;

the image processing apparatus according to claim 1; and a first driver configured to drive the observation target in a direction orthogonal to an optical axis of the objective lens, wherein in the image processing apparatus the obtaining unit obtains an image obtained by driving the first driver to change a region of an image captured by the image sensor as the image data, and the detecting unit detects the region corresponding to the observation target from the image data obtained.

8. The inspection apparatus according to claim 7, further comprising:

a second driver configured to drive the observation target in an optical axis direction of the objective lens, wherein before detection of the region corresponding to the observation target is started by the detecting unit, the second driver drives so that the objective lens and the observation target become a predetermined distance apart.

9. The inspection apparatus according to claim 8, further comprising:

a focus adjusting unit configured to adjust focus by driving the second driver while determining a focused state of an image captured by the image sensor, wherein after detection of the region corresponding to the observation target ends, focus is adjusted to the region corresponding to the observation target by the focus adjusting unit.

10. The inspection apparatus according to claim 7, further comprising:

an operating unit configured to operate the observation target in a direction orthogonal with an optical axis of the objective lens; and a notifying unit configured to communicate that an image captured by the image sensor includes a region corresponding to the observation target.

11. An inspection apparatus comprising:

a storing unit configured to store a plurality of images including an observation target; and the image processing apparatus according to claim 1, wherein in the image processing apparatus the obtaining unit obtains an image stored in the storing unit, and the detecting unit detects the region corresponding to the observation target from the image data obtained.

12. An image processing method executed by an image processing apparatus, comprising:

scanning, by a microscope, a region in which an observation target is arranged and obtaining a plurality of image data corresponding to different positions from each other;

calculating, for each of the plurality of image data, saturation of each pixel of the image data and obtaining an average value of the saturation of each pixel as an average value of the saturation for each image data;

generating a composite image composed of a plurality of pixels corresponding to the plurality of image data; and detecting a region corresponding to the observation target in the plurality of the image data, wherein the generating the composite image including generating the composite image by assigning the average value of the saturation obtained for the image data as a pixel value to a pixel position corresponding to each of the plurality of image data, and the detecting further includes detecting, in the composite image, a region including a pixel having a pixel value greater than a predetermined threshold as the region corresponding to the observation target in the plurality of image data.

13. A microscope system including a microscope, comprising:

a image sensor configured to scan, by the microscope, a region in which an observation target is arranged and obtain a plurality of image data corresponding to different positions from each other;

one or more processors or circuitry configured to perform functions of the following units;

a first color information obtaining unit configured to, for each of the plurality of image data, calculate saturation of each pixel of the image data and obtain an average value of the saturation of each pixel as an average value of the saturation for each image data;

a composite image generating unit configured to generate a composite image composed of a plurality of pixels corresponding to the plurality of image data;

a detecting unit configured to detect a region corresponding to the observation target in the plurality of image data; and a notifying unit configured to communicate that the image data includes a region corresponding to an observation target in a case where the region corresponding to the observation target is detected from the image data, wherein the composite image generating unit generates the composite image by assigning the average value of the saturation obtained for the image data as a pixel value to a pixel position corresponding to each of the plurality of image data, and the detecting unit further detects, in the composite image, a region including a pixel having a pixel value greater than a predetermined threshold as the region corresponding to the observation target in the plurality of image data.

14. A non-transitory computer-readable storage medium storing instructions which perform an image processing method executed by an image processing apparatus, the method comprising:

scanning, by a microscope, a region in which an observation target is arranged and obtaining a plurality of image data corresponding to different positions from each other;

calculating, for each of the plurality of image data, saturation of each pixel of the image data and obtaining an average value of the saturation of each pixel as an
average value of the saturation for each image data;

generating a composite image composed of a plurality of
pixels corresponding to the plurality of image data; and detecting a region corresponding to the observation target 5
in the plurality of the image data, wherein the generating the composite image including generating
the composite image by assigning the average value of
the saturation obtained for the image data as a pixel
value to a pixel position corresponding to each of the 10
plurality of image data, and the detecting further includes detecting, in the composite
image, a region including a pixel having a pixel value
greater than a predetermined threshold as the region corre-
sponding to the observation target in the plurality of image 15
data.

\*　　\*　　\*　　\*　　\*